United States Patent [19]
Slebos

[11] Patent Number: 6,079,170
[45] Date of Patent: Jun. 27, 2000

[54] UNIVERSAL AND MULTI-FUNCTIONAL BUILDING COMPONENT

[76] Inventor: Henk Slebos, P.O. Box 26, 1834 ZG Sint Pancras, Netherlands

[21] Appl. No.: 09/081,355

[22] Filed: May 19, 1998

[30] Foreign Application Priority Data

May 20, 1997 [NL] Netherlands ............................ 1006090

[51] Int. Cl.[7] ..................................................... E04C 2/52
[52] U.S. Cl. ....................... 52/220.1; 52/220.2; 52/220.3; 52/553
[58] Field of Search ............................... 52/220.3, 220.1, 52/220.2, 533; 126/621, 622, 708, 906; 138/112, 115, 116, 117, 177

[56] References Cited

U.S. PATENT DOCUMENTS

| | | | |
|---|---|---|---|
| 2,425,775 | 8/1947 | Yarborough | 126/621 |
| 2,469,963 | 5/1949 | Grosjean | 126/621 |
| 2,726,593 | 12/1955 | Lahti | 126/621 |
| 3,974,822 | 8/1976 | Patil | 128/271 |
| 4,000,850 | 1/1977 | Diggs | 52/220.1 |
| 4,142,511 | 3/1979 | Doughty et al. | 126/271 |
| 4,164,933 | 8/1979 | Alosi | 126/447 |
| 4,224,926 | 9/1980 | Bowden | 126/448 |
| 4,245,621 | 1/1981 | Hollobaugh | 126/450 |
| 4,267,822 | 5/1981 | Diamond . | |
| 4,269,172 | 5/1981 | Parker et al. | 126/450 |
| 4,274,396 | 6/1981 | Peters et al. . | |
| 4,291,680 | 9/1981 | White | 126/443 |
| 4,398,529 | 8/1983 | Schoenfelder | 126/436 |
| 4,777,773 | 10/1988 | Fry | 52/220 |
| 5,509,246 | 4/1996 | Roddy | 52/553 |
| 5,596,981 | 1/1997 | Soucy | 126/704 |
| 5,740,858 | 4/1998 | Ingram | 542/220.2 |

FOREIGN PATENT DOCUMENTS

| | | |
|---|---|---|
| 2 140 400 | 1/1973 | France . |
| 2 591 322 | 6/1987 | France . |
| 0 582 730 | 2/1994 | Germany . |

*Primary Examiner*—Carl D. Friedman
*Assistant Examiner*—Dennis L. Dorsey
*Attorney, Agent, or Firm*—Joan H. Pauly

[57] ABSTRACT

A building component suitable as ceiling, wall, roof and/or floor element, wherein the element is embodied as heat exchanger provided with guide ducts for a heat-bearing fluid, a plate carrying the ducts and fixing means, which building component can be assembled with more than one in a frame into a construction module such that a space for bounding can be provided at random with a heatable or coolable floor, wall or ceiling construction.

26 Claims, 6 Drawing Sheets

UNIVERSAL AND MULTI-FUNCTIONAL BUILDING COMPONENT

BACKGROUND INFORMATION

Technical Field

The invention relates to a building component suitable as ceiling, wall, roof and/or floor element.

Such building components are usually employed in prefabricated building. The objective hereby is a reduction in the building costs so that an acceptable purchase price is obtained for a buyer. The prefabricated ceiling, wall, roof and floor elements are however each manufactured separately to their individual specifications and so are all different structural components. Another important development in the building industry is the arranging of energy-saving systems, for instance solar collectors, in order to reduce energy costs. These are expensive systems, however, and for this reason and because of the fact that they must be installed as additional structural components, they increase building costs considerably.

BRIEF SUMMARY OF THE INVENTION

It is therefore the object of the invention to provide a universal and multi-functional building component which can be manufactured at low cost price and, because of its universal and multi-functional nature, results in low construction costs as well as low energy costs. This is achieved according to the invention in that the building component suitable as ceiling, wall, roof and/or floor element is a heat exchanger provided with guide ducts for a heat-bearing fluid, a plate carrying the ducts, and fixing means.

In this manner an exceptionally advantageous building component is provided, wherein energy systems and structural component are combined in one element and with which a ceiling, wall, roof or floor is formed.

It is recommended to assemble the building component from connectable modules. Building components of different dimensions are obtained by combining a differing number of standard modules.

The module preferably has complementary coupling profiles on its longitudinal sides and an enclosing conduit on one longitudinal side. A guaranteed water sealing of the building component, particularly as roof element, is obtained in this case.

The ducts of the building component are connected to a hot water supply, heating, cooling installation and/or ducts of another building component. In this way the fluid, which absorbs heat on the one side, will relinquish this absorbed heat on the other side. A roof element serving as solar collector can thus accumulate solar energy in order to heat the water for domestic use or supply the radiators therewith. It is also possible to cause the fluid coming from the roof elements or a central heating boiler to flow to other building components, i.e. wall, floor, ceiling elements, so that the building components function in fact as radiators. Conversely, the building components can be connected in the summer to a cooling installation to cool room areas.

The module or the mutually coupled modules is or are preferably enclosed by a frame for mounting purposes. This frame surround makes the building component exceptionally easy to handle.

In an embodiment of the building component as roof element, the frame has a standing edge on which is arranged a plate of transparent material such as glass which covers the module(s). In this way a high efficiency solar collector is obtained. In addition, an attractive as well as water and dirt-repelling finish of the building component is obtained.

In order to absorb the expansion of the building components resulting from a temperature increase thereof, an expansion coupling is arranged in each case between two building components.

By extruding the module from aluminium, wherein during the extrusion the ducts are preferably also formed in the plate, a considerable saving in production costs is achieved. Since no further treatments need be performed on the extruded module, a very low cost price is obtained.

The rear side of the building component is preferably covered with insulation material for optimum use of heat exchange with the desired environment.

BRIEF DESCRIPTION OF THE DRAWINGS

The invention will be elucidated with reference to the annexed drawings. In the drawings.

DETAILED DESCRIPTION OF THE INVENTION

Figure 1:
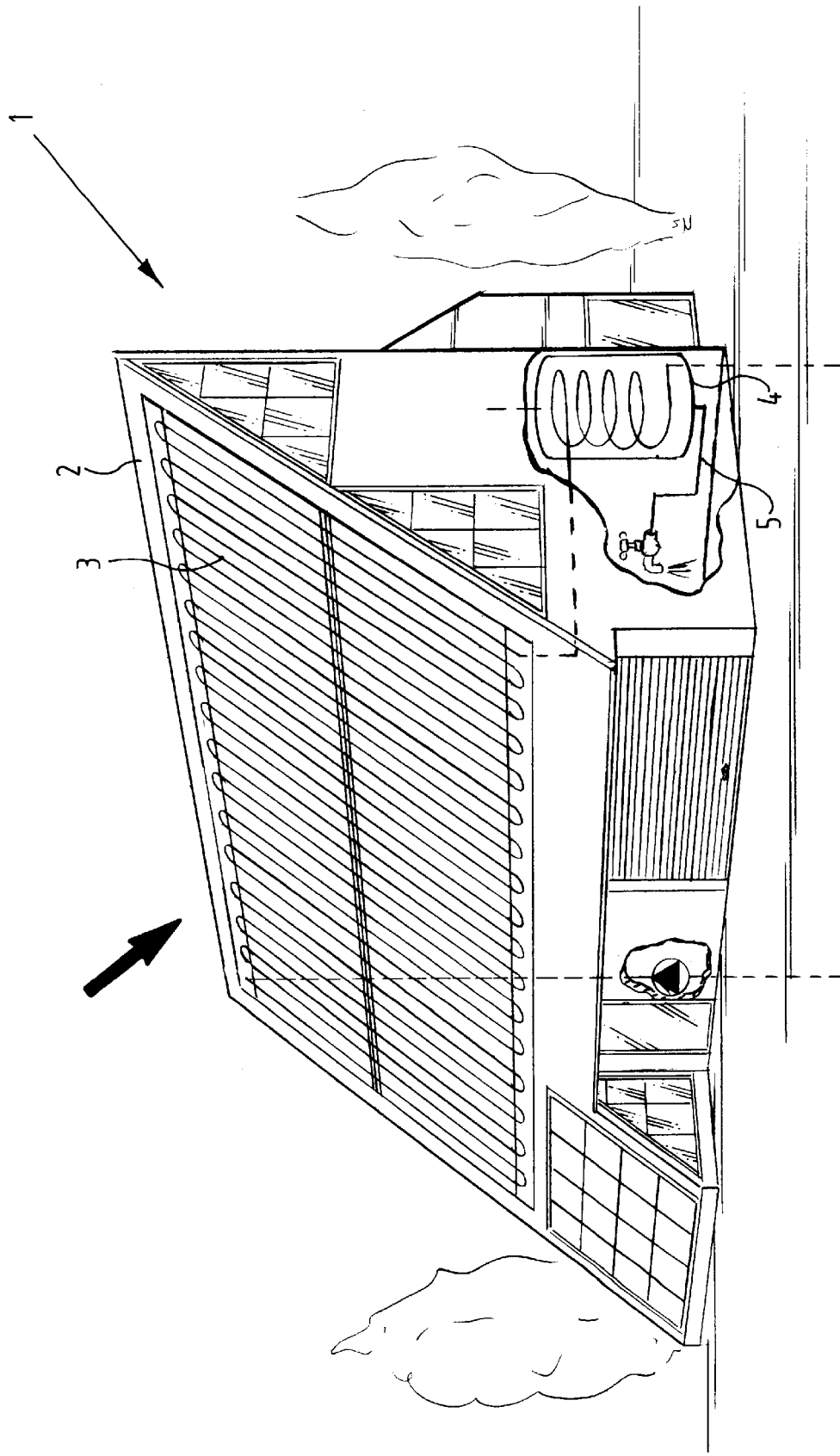
FIG. 1 shows a perspective view of a residential dwelling with building components as roof elements according to the invention.

FIG. 1 shows a residential dwelling 1 which has a roof 2. Roof 2 is placed at an angle of inclination such that an optimal accumulation of solar heat can be obtained. Roof 2 is formed by building components which are mutually connected. The fluid for heating, for instance water, is supplied at the one end of through-flow ducts 3 of roof elements 2, while the hot fluid obtained at the other end is guided via boiler 4 back to the starting point. The water pipes 5 of dwelling 1 run via boiler 4 to different draw-off points, such as the shower, (dish) washing machine, radiator and so on in dwelling 1.

Figure 2:
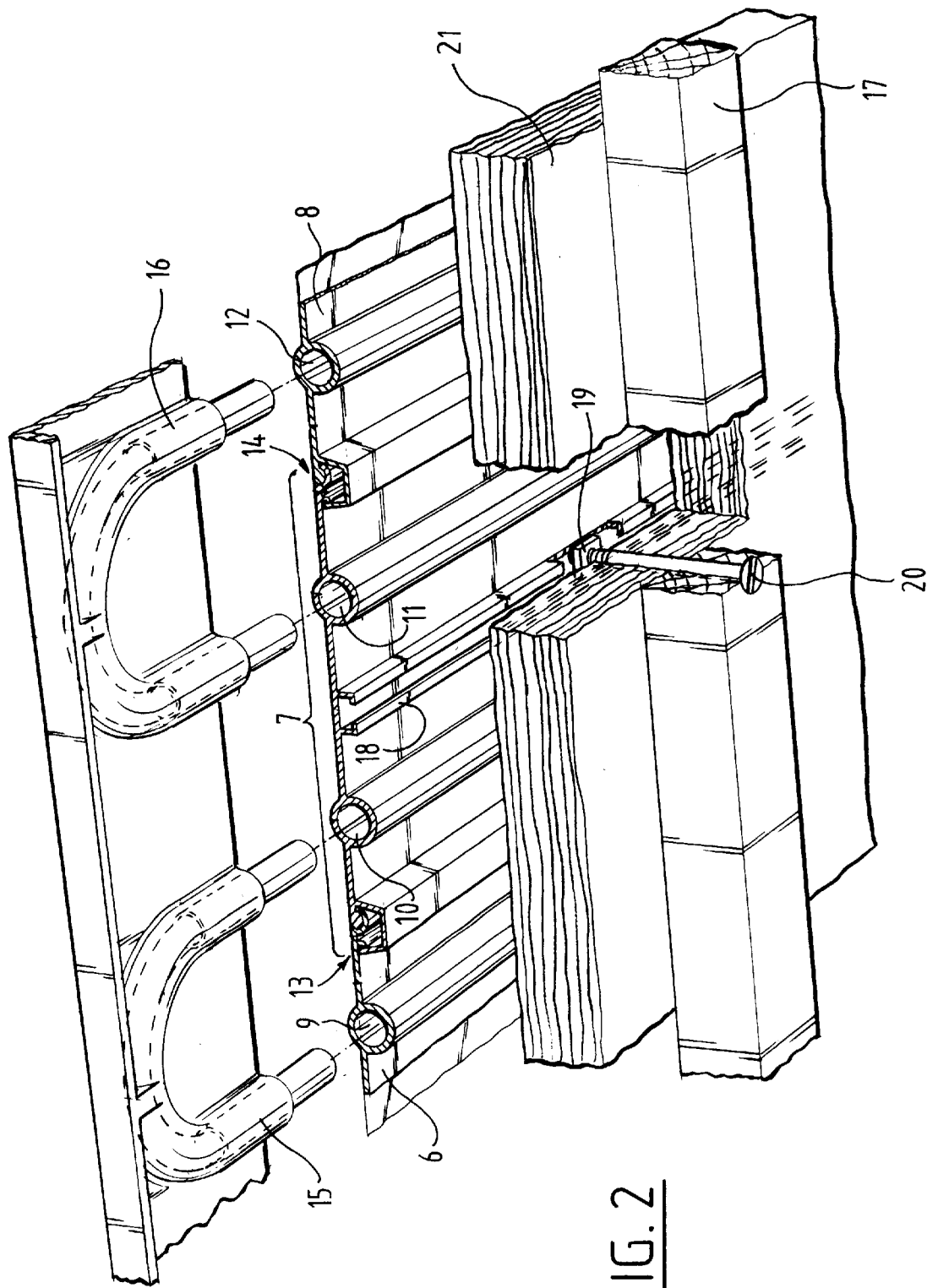
FIG. 2 shows a detail of the building component as floor element.

In FIG. 2 is shown an embodiment of the building component as floor element. Modules 6, 7 and 8 each consist of a single plate which is extruded from aluminium, wherein during the extrusion through-flow ducts 9, 10, 11 and 12 are formed integrally with the plate. Module 6 is coupled to module 7 at the point 13 and module 7 to module 8 at the point 14. It must be noted here that modules 6 and 8 are not shown in their entirety. Couplings 13, 14 are formed by complementary coupling profiles on the longitudinal sides of respective modules 6, 7 and 8. The longitudinal side of a module is hooked together in each case with the other longitudinal side of the other module. Over this coupling runs a channel which encloses the coupling and which is formed on a longitudinal side of each module. Coupling pieces 15, 16 are arranged on the end surfaces of the mutually coupled modules to connect respectively duct 9 to 10 and 11 to 12. Through ducts 9, 10, 11 and 12 can flow hot fluid originating for instance from the roof elements. The floor elements serving as floor heating are fixed to floor beams 17 by means of an open conduit 18 arranged on each module, a connecting member 19 engaging therein and a screw 20. Insulation material 21 is arranged between floor beam 17 and the floor element.

Figure 3:
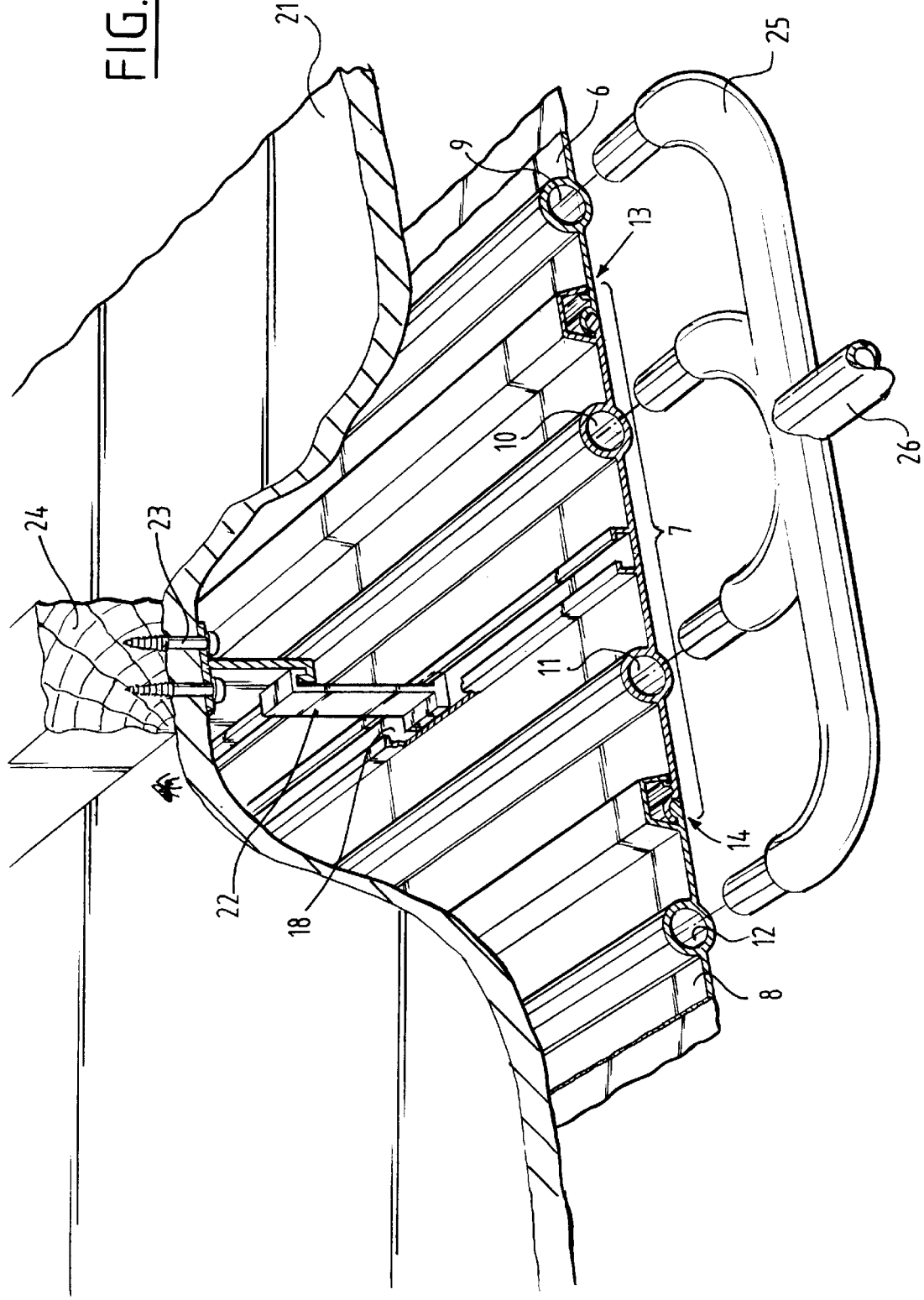
FIG. 3 shows a detail of the building component as ceiling element.

In FIG. 3 the building component is used as ceiling. In this case the ceiling element is suspended from floor beams 24 of the storey above by means of a connecting member 22 engaging in the open conduit 18 and the bolts 23. The guide ducts 9, 10, 11 and 12 are coupled in this embodiment by means of coupling piece 25. This latter has an opening 26 which serves as an inlet or outlet for the fluid. The opening 26 of coupling piece 25 can then be connected to a corresponding opening of another building component lying adjacently thereof or, as roof element, forming the roof. It is also possible to transport a cold fluid through guide ducts 9, 10, 11 and 12 so that the ceiling element cools the space by absorbing the heat therefrom.

Figure 4:
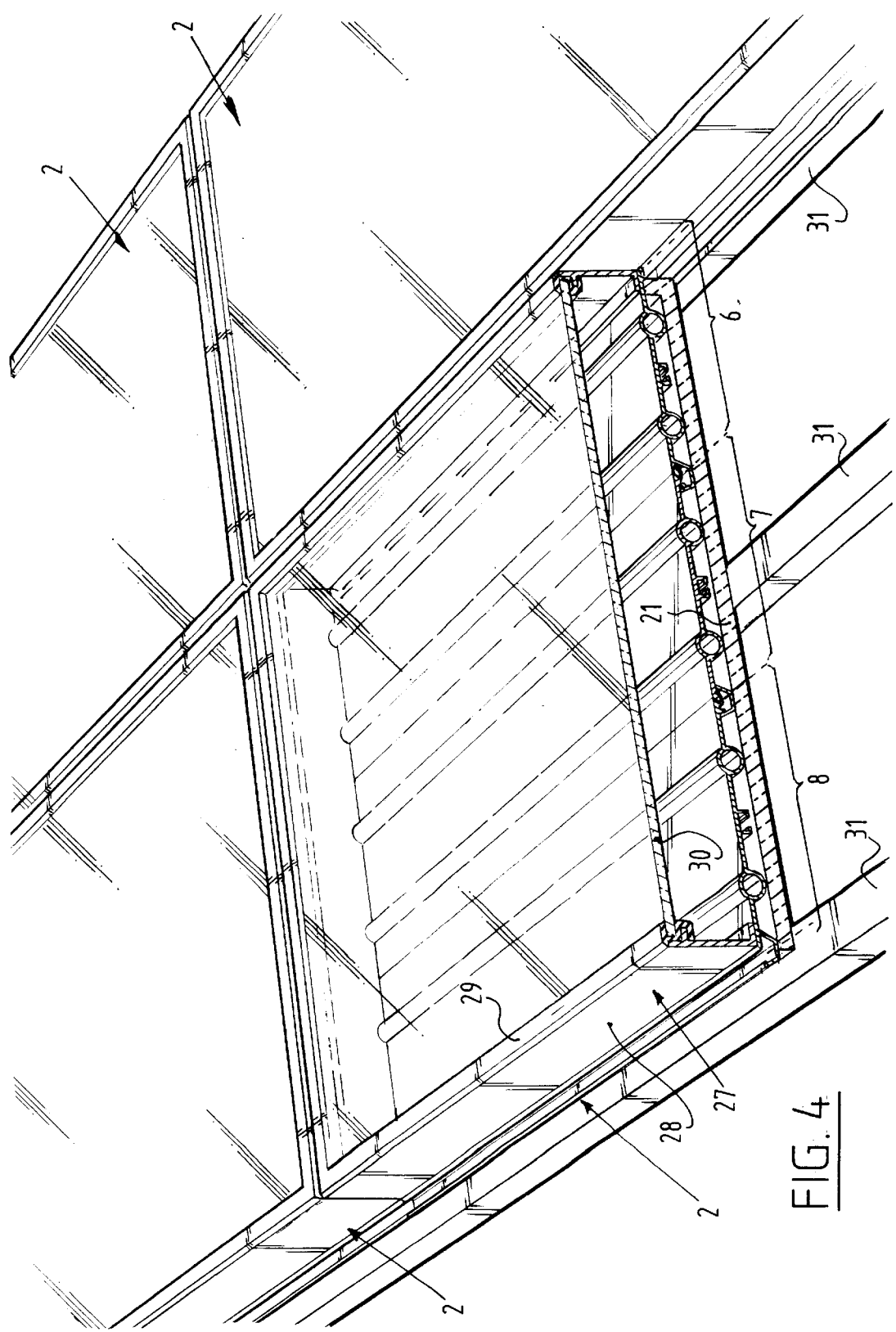
FIG. 4 shows a cross-section of the building component as roof element of the high efficiency type.

FIG. 4 shows a number of building components which form the roof of dwelling 1. Each roof element 2 is built up of three modules 6, 7, 8. The three mutually connected modules 6, 7, 8 are enclosed by a frame 27. Frame 27 has an upright edge 28 with a flange strip 29 under which is clamped a glass sheet 30. Roof elements 2 are fixed to the roof trusses 31. High efficiency solar collectors are obtained in this manner. It is also possible to form the roof solely with modules 6, 7, 8 without frame 27 and glass sheet 30 and thus obtain a low efficiency solar collector.

Figure 5:
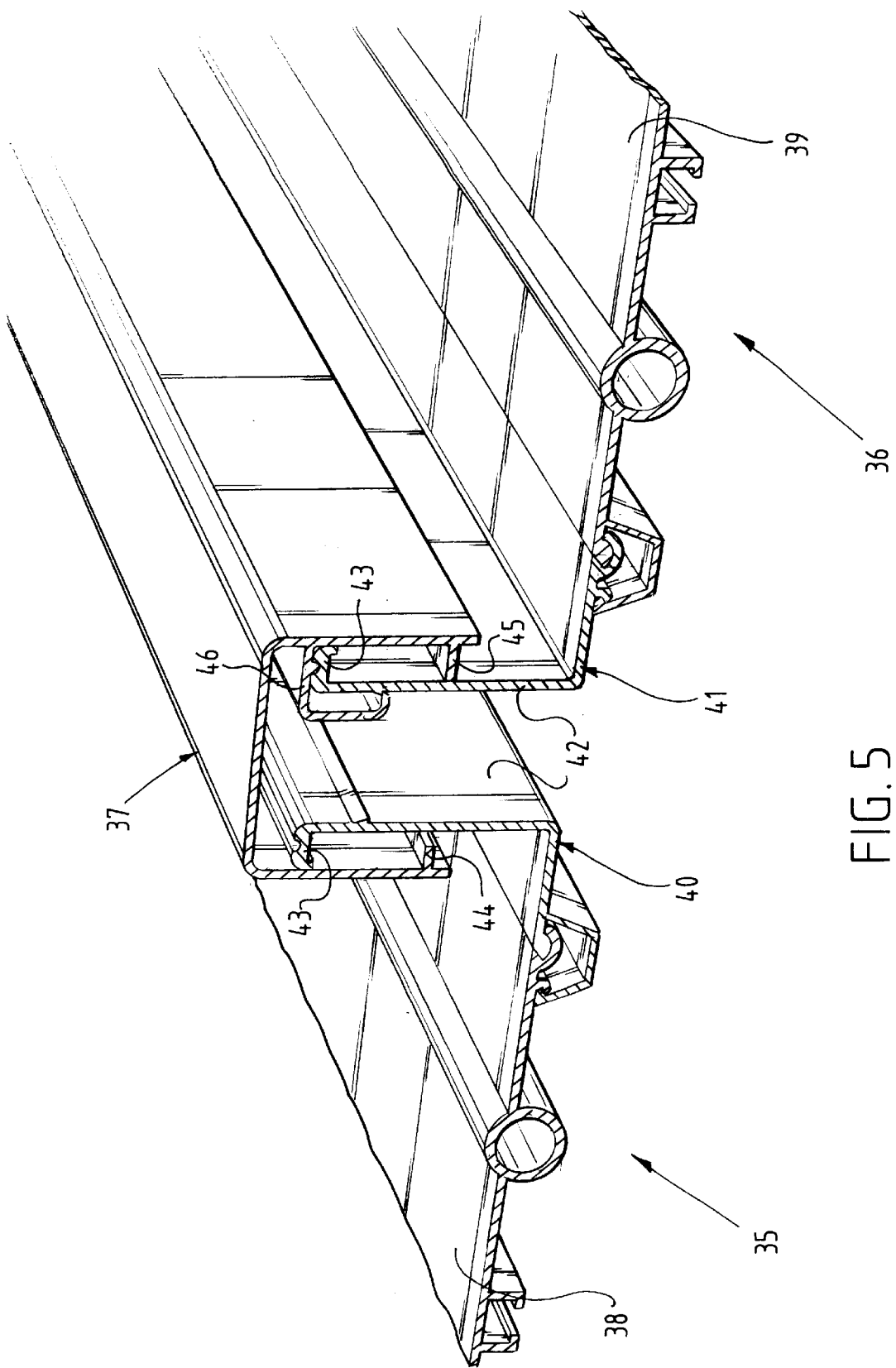
FIG. 5 shows a detail of an embodiment of an expansion coupling arranged between two building components.

In order to absorb expansion of the modules as a result of a temperature increase thereof, an expansion coupling 37 is arranged in each case between two building components 35, 36 (see FIG. 5). The side modules 38, 39 of each building component 35, 36 are connected to a frame 40, 41. Frame 40, 41 has an upright edge 42 with a flange strip 43. Expansion coupling 37 is a U-shaped channel with two inward pointing flange strips 44, 45 which are arranged on the open side of expansion coupling 37. On the side remote from the open side an L-shaped flange strip 46 is arranged on one side. The one frame 41 is clamped between flange strip 46 and flange strip 45, while the other frame 40 is arranged freely in expansion coupling 37. When building components 35, 36, and therefore modules 38, 39, expand, the frames 40, 41 displace toward each other. Expansion coupling 37 herein continues to remain in place over frames 40, 41 and clamped to frame 41.

Figure 6:
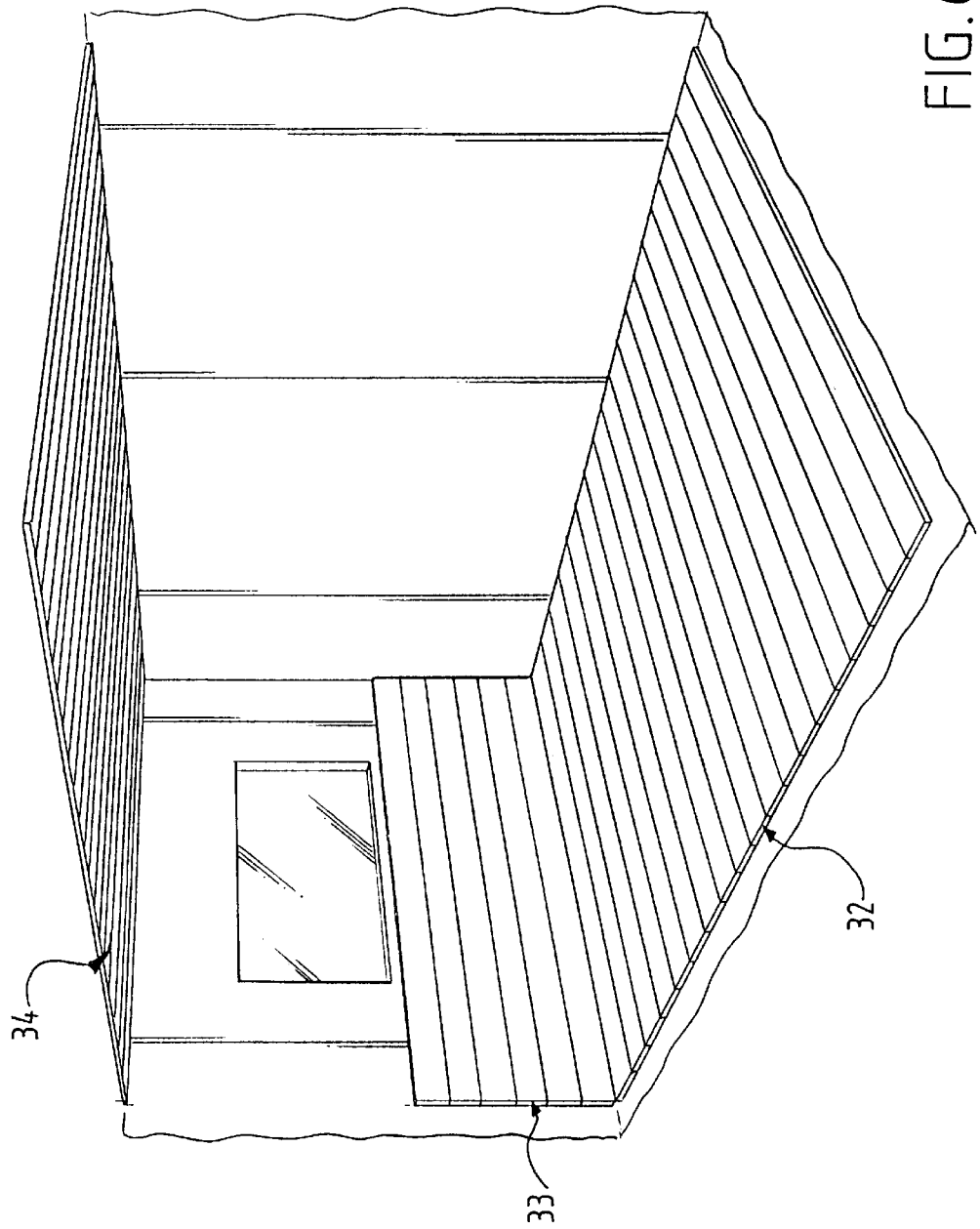
FIG. 6 shows a perspective view of a room in a residential dwelling with building components as floor, wall and ceiling.

FIG. 6 shows a room in which modules are mutually connected and form floor 32, a part of wall 33 and ceiling 34.

It is finally noted that, although not shown, it is possible to arrange provisions in the building component for lighting, electricity, water, air-conditioning and so on.

What is claimed is:

1. Building component suitable as a ceiling, wall, roof and/or floor element, characterized in that the component is embodied as a heat exchanger provided with guide ducts for a heat-bearing fluid, and a plate carrying the ducts, said plate including portions configured to receive a connecting member suitable for connecting the component to a structural support member of a structure into which the component is to be incorporated; the component being assembled from connectable modules, the modules being of a sufficiently narrow standard width to enable assembly of building components of different dimensions by varying the number of modules in the components;

wherein each module includes a single plate extruded from metal and at least one of said ducts, said duct being formed integrally with said plate during extrusion.

2. Building component as claimed in claim 1, characterized in that each module has complementary coupling profiles formed on its longitudinal sides, said profiles on each module being configured to engage the profiles on adjacent modules to couple the modules to each other, and an enclosing channel formed on one longitudinal side and positioned to enclose interengaged profiles of adjacent modules.

3. In combination:
a pair of adjacent building components as claimed in claim 1 or claim 2; and an expansion coupling arranged between the building components of said pair and coupling said components together while allowing said components to displace toward each other in response to thermal expansion of said components.

4. Building component as claimed in claim 1, characterized in that the component has a rear side covered with insulation material.

5. Building component as claimed in claim 1, characterized in that provisions are arranged in the plate for lighting, electricity, water, and air-conditioning.

6. Building component as claimed in claim 1, wherein said portions comprise an elongated open conduit configured to receive an end portion of the connecting member.

7. Building component as claimed in claim 1, characterized in that each module has complementary coupling profiles integrally formed with said plate on its longitudinal sides, said profiles on each module being configured to engage the profiles on adjacent modules to couple the modules to each other.

8. Building component as claimed in claim 7, further comprising an enclosing channel integrally formed with said plate on one longitudinal side and positioned to enclose interengaged profiles of adjacent modules.

9. Building component suitable as a ceiling, wall, roof and/or floor element, characterized in that the component is embodied as a heat exchanger provided with guide ducts for a heat-bearing fluid, and a plate carrying the ducts, said plate including portions configured to receive a connecting member suitable for connecting the component to a structural support member of a structure into which the component is to be incorporated; the component being assembled from connectable modules, the modules being of a sufficiently narrow standard width to enable assembly of building components of different dimensions by varying the number of modules in the components;

wherein the modules are enclosed by a frame.

10. Building component as claimed in claim 9, characterized in that the ducts are configured to receive couplings to connect said ducts to a hot water supply, heating, or cooling installation and/or ducts of another building component.

11. Building component as claimed in claim 1 or claim 2, characterized in that the ducts are configured to receive couplings to connect said ducts to a hot water supply, heating, or cooling installation and/or ducts of another building component.

12. Building component as claimed in claim 11 characterized in that the component has a rear side covered with insulation material.

13. Building component as claimed in claim 10, characterized in that the component has a rear side covered with insulation material.

14. Building component as claimed in claim 6, characterized in that provisions are arranged in the plate for lighting, electricity, water, and air-conditioning.

15. Building component as claimed in claim 14, characterized in that each module has complementary coupling profiles formed on its longitudinal sides, said profiles on each module being configured to engage the profiles on adjacent modules to couple the modules to each other, and an enclosing channel formed on one longitudinal side and positioned to enclose interengaged profiles of adjacent modules.

16. Building component as claimed in claim 10, characterized in that provisions are arranged in the plate for lighting, electricity, water, and air-conditioning.

17. Building component as claimed in claim 10, characterized in that the frame has a standing edge on which is arranged a plate of transparent material which covers the modules.

18. Building component as claimed in claim 9, characterized in that the frame has a standing edge on which is arranged a plate of transparent material which covers the modules.

19. In combination:
    a pair of adjacent building components as claimed in claim 9; and an expansion coupling arranged between the building components of said pair and coupling said components together while allowing said components to displace toward each other in response to thermal expansion of said components.

20. Building component as claimed in claim 9, characterized in that each module has complementary coupling profiles formed on its longitudinal sides, said profiles on each module being configured to engage the profiles on adjacent modules to couple the modules to each other, and an enclosing channel formed on one longitudinal side and positioned to enclose interengaged profiles of adjacent modules.

21. Building component as claimed in claim 20, characterized in that the frame has a standing edge on which is arranged a plate of transparent material which covers the modules.

22. In combination:
    a pair of adjacent building components as claimed in claim 20; and an expansion coupling arranged between the building components of said pair and coupling said components together while allowing said components to displace toward each other in response to thermal expansion of said components.

23. Building component as claimed in claim 20, characterized in that the ducts are configured to receive couplings to connect said ducts to a hot water supply, heating, or cooling installation and/or ducts of another building component.

24. Building component as claimed in claim 23, characterized in that provisions are arranged in the plate for lighting, electricity, water, and air-conditioning.

25. Building component as claimed in claim 23, characterized in that the component has a rear side covered with insulation material.

26. Building component as claimed in claim 23, characterized in that the frame has a standing edge on which is arranged a plate of transparent material which covers the modules.

\* \* \* \* \*